United States Patent [19]

Thomas

[11] Patent Number: 4,566,347

[45] Date of Patent: Jan. 28, 1986

[54] PROGRAMMER

[75] Inventor: Francis Thomas, Cluses, France

[73] Assignee: Societe Industrielle de Bellevaux, Sibel, Cluses, France

[21] Appl. No.: 631,860

[22] Filed: Jul. 18, 1984

[30] Foreign Application Priority Data

Jul. 19, 1983 [FR] France ............................... 83 12502

[51] Int. Cl.[4] ...................... F16H 29/12; H01H 43/10

[52] U.S. Cl. .................................. 74/125; 74/568 T; 200/38 A

[58] Field of Search ................. 74/116, 122, 125, 528, 74/568 T, 625, 553; 200/37 A, 38 A, 38 B, 38 C, 38 D, 38 DA

[56] References Cited

U.S. PATENT DOCUMENTS

| | | | |
|---|---|---|---|
| 1,919,255 | 7/1933 | Porter | 200/38 A |
| 2,536,256 | 1/1951 | Berg | 200/38 A |
| 2,805,293 | 9/1957 | Daugherty | 200/38 A |
| 2,913,913 | 11/1959 | Weber | 74/125 |
| 2,984,716 | 5/1961 | Timm et al. | 200/37 A |
| 3,042,762 | 7/1962 | Palladino | 200/38 A |
| 3,597,982 | 8/1971 | Julien-Davin | 200/38 B |
| 3,627,937 | 12/1971 | Swanke | 200/38 B |
| 4,406,953 | 9/1983 | Tanaka et al. | 200/38 A |

FOREIGN PATENT DOCUMENTS

| | | | |
|---|---|---|---|
| 426992 | 6/1967 | Switzerland | 200/38 B |

*Primary Examiner*—Lawrence J. Staab
*Attorney, Agent, or Firm*—Robert E. Burns; Emmanuel J. Lobato; Bruce L. Adams

[57] ABSTRACT

A programmer comprising a cam unit which can be rotated manually in a first direction by a control shaft 23 able to occupy, under the action of a pawl device comprising a spring, any one of several equidistant stable angular stop positions spaced apart by the angular value of one step, before passing on each occasion through a limiting unstable intermediate angular position, after which this shaft is brought in a resilient manner by the pawl device towards the following stable angular stop position. A motor and drive transmission system are able, when controlled, to rotate the cam unit step by step in said first direction. The cam unit is connected to rotate with the control shaft, with an angular clearance less than the angle through which the shaft travels, between any one of its stable angular stop positions and the limiting unstable intermediate angular position which follows.

4 Claims, 4 Drawing Figures

PROGRAMMER

The present invention relates to programmers comprising a programme cam unit able to be set in rotation manually in a certain direction by a control shaft able to occupy, under the action of a device comprising a spring, any one of several equidistant, stable angular stop positions, spaced apart by the angular value of one step before passing on each occasion through a limiting unstable intermediate angular position, after which this shaft is brought in a resilient manner by the device comprising a spring towards the following stable angular stop position. When controlled, an automatic drive member is able to rotate the cam unit step by step in the same direction. Programmers of this type control for example domestic electrical appliances such as washing machines or dish-washers, tumble driers etc.

In known programmers of this type, such as that described in French Pat. No. 2 279 152, the cam unit is connected angularly and rigidly to its control shaft, which has certain drawbacks when this control shaft is rotated manually by a user, the automatic drive member generally not being actuated at this instant. In fact, when the control shaft is set in rotation manually in this way, the various levers, springs, contacts . . . which co-operate both with the "upwards slopes" or "downwards slopes" of the contours of the cams constituting the cam unit, and with the control shaft in order to position the latter angularly, mean that for its drive, depending on the angular position which it occupies, this control shaft requires different forces, which tend to rotate it in an irregular manner. It thus happens that when the user rotates the control shaft manually, he unintentionally moves sightly past the desired angular stop position. The cam unit, connected angularly to the control shaft, goes past the position in the same way. As long as this excess movement remains less than approximately half a degree, then most frequently nothing abnormal happens, the resilient means for the angular positioning of the control shaft restoring the latter and the cam unit to the desired angular stop position and no lever or contact having been actuated. If this excess movement is greater, for example two or three degrees in the case where one "step" is equal to approximately 6°, a serious drawback occurs with regard to certain switches controlled by certain cams which change state, i.e. level, after a rotation of approximately half a degree, which prevents the cam unit from returning to the stop position passed unintentionally. This is the case for example when the recesses of the contour of one or more cams have caused levers to drop, which thus prevent any return of the cam unit. In a situation of this type, as soon as the automatic drive means for the cam unit is controlled in turn, the switches which have been actuated unintentionally, cause either the advance of the cam unit to the following angular stop position and one step is thus jumped over, or they cause a function to be carried out which is not desired at this instant. Thus for example, in a washing machine, in order to control spinning of the clothes, successive angular stop positions of the cam unit exist, for example corresponding respectively to operations of: . . . emptying No. 3, spinning No. 3, filling No. 4, emptying No. 4, spinning No. 4 and finally STOP. For example, the user may wish to eliminate a spinning operation by moving the control shaft and the cam unit manually from the angular position "spinning No. 3" to the angular position "spinning No. 4". If this last operation is unintentionally exceeded by more than approximately half a degree, the cam unit is moved on angularly to the next stop position "STOP" and the washing machine stops without the spinning operation No. 4 having been effected.

The present invention proposes to allow the construction of an improved programmer which continues to operate normally, even when the user, whilst actuating the control shaft for the cam unit manually, unintentionally moves past the desired angular stop positions and this is without the cam unit being caused to jump one step inopportunely or to control prematurely an operation which is not desired at this instant.

The programmer according to the invention is characterised in that cam unit is connected to rotate with the control shaft, with an angular clearance less than the angle through which the shaft travels, between any one of its stable angular stop positions and the limiting unstable intermediate angular position which follows.

According to the one embodiment in which the device comprising a spring co-operates in succession with the equidistant teeth of a toothed moving member connected kinematically to the control shaft, the angular clearance is less than the angle through which the shaft travels, between any one of its stable angular stop positions, in which the device comprising a spring co-operates with a recess between two consecutive teeth of the toothed moving member and the limiting unstable intermediate angular position which follows, in which the device comprising a spring co-operates with the top of the following tooth.

Thus, the cam unit is able to be set in rotation manually by an action on its control shaft, with a delay equal to the angular clearance, then, when its automatic driving member is controlled, it may then take up at least partly automatically this angular clearance during the end of the change of step which is under way.

The accompanying drawings illustrate by way of example one embodiment of the programmer according to the present invention.

Figure 1:
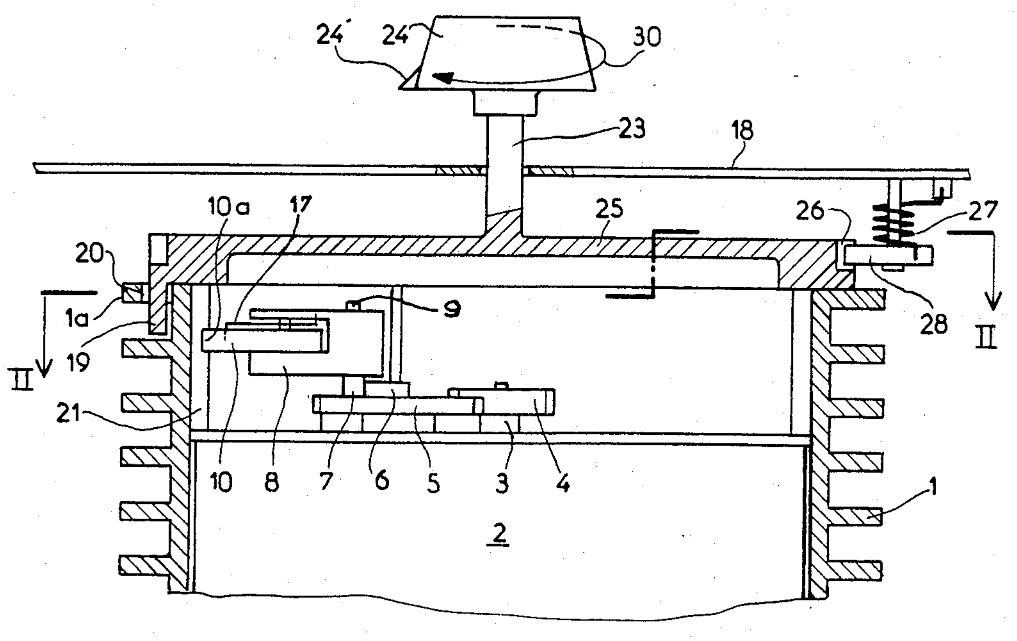
FIG. 1 shows this embodiment of the invention partially, in section on line I—I of FIG. 2.

As illustrated in FIGS. 1 to 4, the programmer comprises a programme cam unit 1 whereof only one end is illustrated in FIG. 1. This cam unit 1 is mounted to pivot for example about a micro-motor 2 which is located inside the cam unit 1 and which is supported by a plate which is not shown in the drawings.

A control shaft 23 (FIG. 1), which is coaxial with the cam unit 1, comprises at its free end an operating knob 24 provided with a lug 24'. At its other end, it is integral with a driving plate 25 which closes off the open end of the hollow cam unit 1. This driving plate 25 comprises one or more driving segments 19, arranged concentrically with respect to the control shaft 23 parallel to the latter, housed respectively in housings 20 provided through the first cam **1*a* of the cam unit 1**.

On its outer periphery the driving plate 25 comprises external toothing 26, for example with serrated teeth, with which a positioning pawl 28 supported by a plate 18 tends to be constantly in engagement under the action of a spring 27, the shape and arrangement of which members are adapted to the profile of the serrated teeth which are orientated in order to allow a free rotation of the cam unit 1 in the direction of arrow 30. This external toothing 26 comprises as many teeth as there are angular "steps" for a full revolution of the cam unit 1, for example sixty. Under the action of the device comprising a spring, constituted by the positioning pawl 28 and by the spring 27, the control shaft 23 is thus able to occupy any one of sixty equidistant stable angular stop positions in which the nose of the positioning pawl is housed in the base of one of the serrated teeth 26.

An angular clearance a (FIG. 2) exists between each driving segment 19 and the corresponding housing 20. It has a value less than the angle through which the control shaft 23 travels, between any one of its sixty stable angular stop positions and the limiting unstable intermediate angular position which follows, in which the positioning pawl 28 co-operates with the top of the next serrated tooth 26. Since the angular value of the step in this example is equal to 6°, the angular clearance a is for example equal to 4°. Thus, the cam unit 1 is connected to rotate with the control shaft 23, with an angular clearance of 4°.

Figure 2:
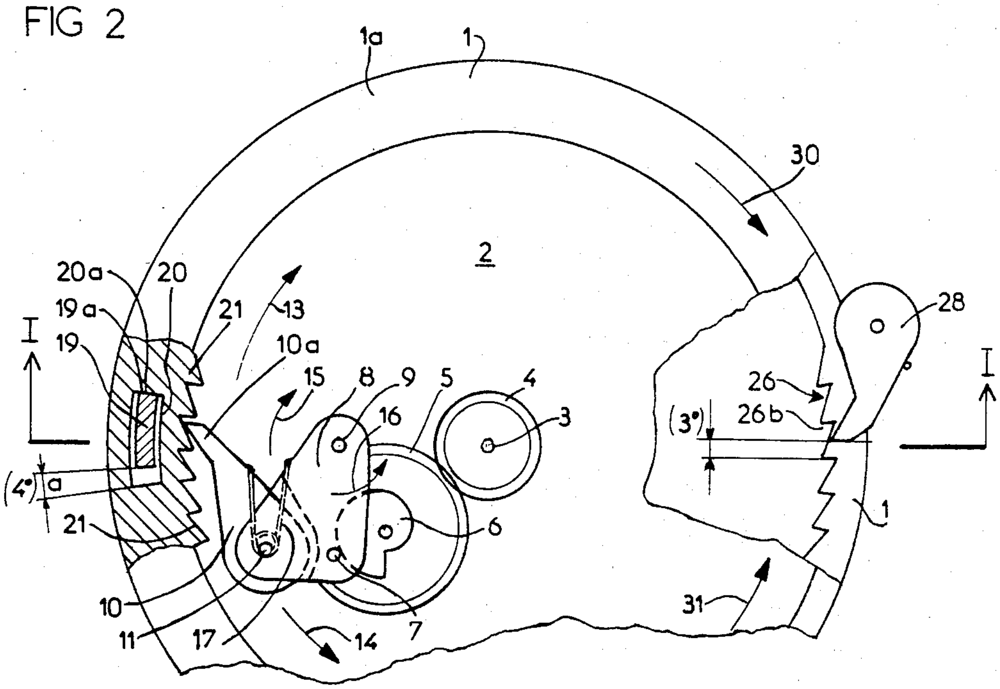
FIG. 2–4 show the same embodiment, in section on line II—II of FIG. 1, at different stages of operation.

On its output shaft 3, the motor 2 supports a toothed pinion 4 which meshes with a toothed wheel 5 with which a feed cam 6, in the shape of a snail, is integral, against which there presses constantly a pin 7 forming part of an oscillating pawl support 8 mounted to pivot about a shaft 9. This oscillating pawl support 8 supports a feed pawl 10, pivoted at 11, provided to move alternately forwards in the direction of arrow 13 and backwards in the direction of arrow 14, when the pawl support 8 is respectively raised in the direction of arrow 15 by the feed cam 6, then released suddenly in the direction of arrow 16 at the instant when the pin 7 drops to the lower level of this cam 6 (FIG. 2). A torsion-spring 17, located around the shaft 11, tends to keep the pin 7 constantly pressed against the cam 6 and the nose 10*a* of the feed pawl 10 in mesh with internal toothing 21 comprising serrated teeth provided on the inner periphery of the cam unit 1. Like the toothing 26, this inner toothing 21 comprises as many teeth as there are angular steps for a full revolution of the cam unit 1, in this example sixty. The motor 2, the feed pawl 10 and/all the members which connect them to each other constitute automatic drive means which are able, when controlled, to rotate the cam unit 1 automatically step by step in the direction of arrow 13.

Let us assume that initially the motor 2 is not supplied with power. The user, who wishes for example to select a certain programme, must move the lug 24' of the operating knob 24 opposite a fixed reference corresponding to the beginning of this programme, by rotating this knob 24 manually in the direction of arrow 30. Taking into account the angular clearance a of 4°, the plate 25 first of all rotates alone, then, with a delay of 4°, rotates the cam unit 1 in the direction of arrow 30 also, the positioning pawl 28 jumping one tooth 26 for each angular movement of one step, of the control shaft 23 and of the plate 25. If the user, when rotating the control shaft 23 manually, unintentionally moves past the desired angular stop position, for example by 3°, the various members at this instant occupy the position illustrated in FIG. 2. The positioning pawl 28 presses against the inclined side of a serrated tooth 26*b*, 3° after the stable angular stop position which has been passed. On the other hand, at the same instant, the front edge 19*a* of each segment 19 presses against the front edge 20*a* of each corresponding housing 20 which is entrained, at the same time as the cam unit 1, in the diection of arrow 30. This cam unit 1, being staggered by 4° towards the rear with respect to the operating knob 24, has thus not yet reached one of its angular stop positions provided since it is separated therefrom 1°(=4°-3°).

Figure 3:
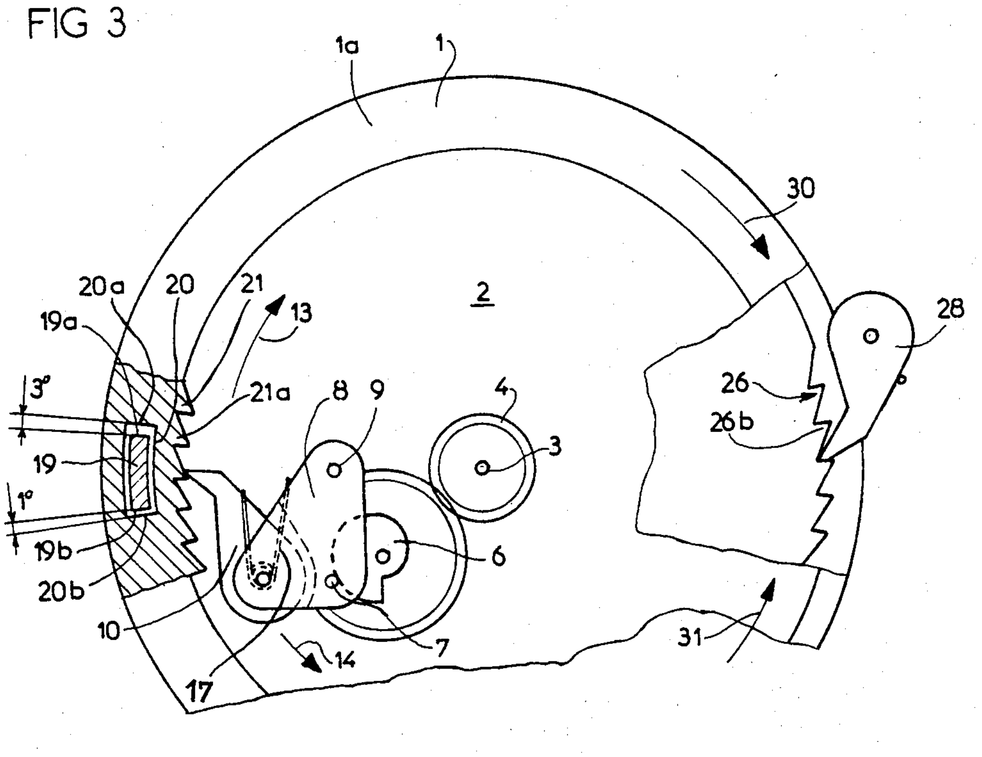
Figure 4:
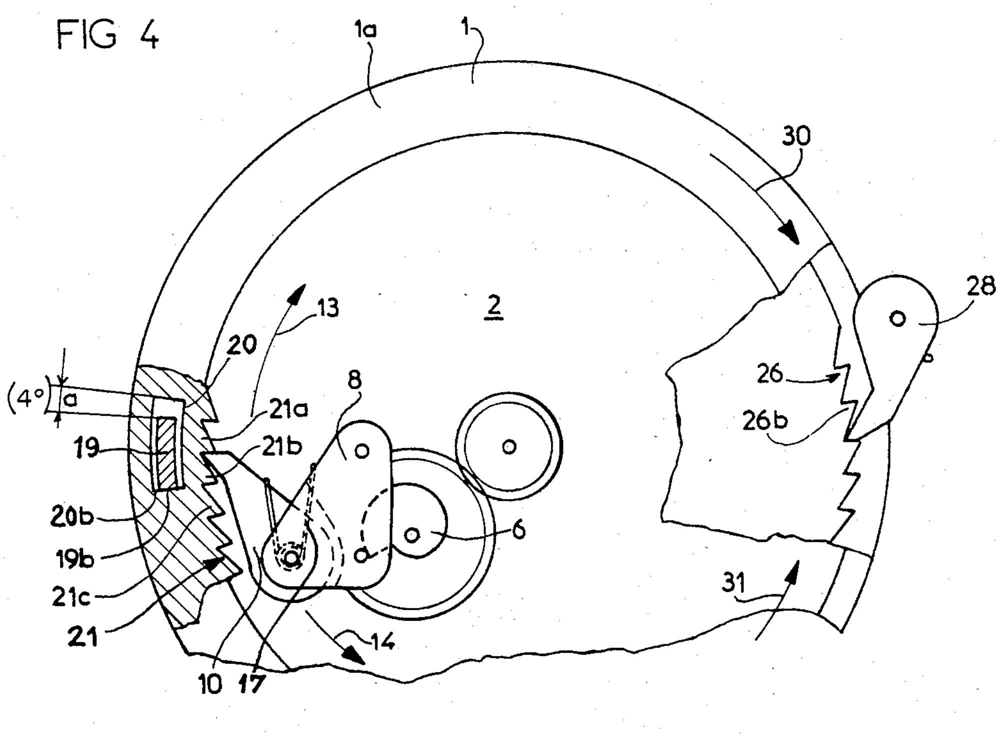

As soon as the user releases the operating knob 24, the positioning pawl 28, under the action of its spring 27, acts on the inclined side of the serrated tooth 26*b*, which causes the rotation of the plate 25, in the opposite direction to arrow 30, namely in the direction of arrow 31, by 3°, until this plate 25 occupies the stable angular stop position which was exceeded by 3°. The various members thus occupy the position illustrated in FIG. 3. At the same time, the cam unit 1 remains stationary, the angular clearance of each segment 19 in their corresponding housing 20 being divided: 3° towards the front, 1° towards the rear (FIG. 3).

When the motor 2 is then supplied with power by the user, in order to control the operation of the automatic driving means, thus the carrying out of the programme, the first revolution made by the feed cam 6 causes an oscillaton in the direction of arrow 15 of pawl support 8, thus an advance in the direction of arrow 13 of the feed pawl 10 which also pushes one tooth 21*a* thus the cam unit 1, in the direction of arrow 13 by a sufficient angle, in this example 1°, in order that the latter reaches its angular stop position provided, at the end of the step. The various members then occupy the position illustrated in FIG. 4. The rear edge 20*b* of each housing 20 has just arrived flush with the rear edge 19*b* of the corresponding segment 19, the plate 25 thus not being rotated and thus maintaining the initial desired stable stop position.

This new angular position of the cam unit 1 causes the actuation of a certain number of electrical contacts, in this example corresponding to the beginning of the programme chosen by the user.

If the programme selected provides several successive advances of the cam unit 1, by one step, at a relatively high speed, for example every four seconds, the feed pawl 10 may mesh in succession with the teeth 21*b*, 21*c* . . . (FIG. 4) which follow the tooth 21*a*. If, on the contrary, the programme provides a stoppage for a predetermined period of time, for example of four minutes, after the advance of the tooth 21*a*, the cam unit maintains its angular position of FIG. 1, as long as the delay period is not terminated. This period may be determined by a delay device which is not shown in the drawing, such as that described for example in French Patent No. 2 495 353.

If the user manually rotates the knob 24 in the direction of arrow 30 during the automatic operation of the programmer, thus while the chosen programme is being carried out, the operation is similar. In this case, as soon as the user has actuated the knob 24, in order to bring the latter opposite the new desired stable angular stop position, the cam unit 1 takes up the corresponding angular stop position.

In our example, it is thus possible to actuate the operating knob 24, by moving past the chosen stable angular stop position by a maximum of 4° with the knob 24, without the cam unit 1 exceeding the stop position corresponding to the end of a step, which prevents any inopportune jumping of a step.

Without diverging from the scope of the present invention, the outer toothing 26 may not be serrated toothing, but may comprise for example teeth whereof the sides are inclined symmetrically in an identical manner. In this case, after an angular movement of 3° of the plate 25, from one of its stable angular stop positions, the positioning pawl 28 reaches the top of one tooth of the toothing 26. From this unstable position, the pawl 28 entrains the plate 25 in the direction of arrow 30 as far as the following stable stop position of the latter, which causes the inopportune advance of the cam unit 1, by an additional step.

Without diverging from the scope of the present invention, the toothing 26 may not be supported by the plate 25, but by another movable member connected kinematically to this plate 25, the movable member itself supporting the control shaft 23 and the knob 24.

What is claimed is:

1. A programmer comprising a programme cam unit, means for rotating said cam unit manually in a first direction comprising a manually rotatable control shaft, means for resiliently positioning said control shaft, as it is rotated, in successive stable angular positions spaced apart by the angular value of one step, while passing in each instance through an intermediate limiting unstable angular position and thereafter bringing said control shaft resiliently from a limiting unstable angular position to the next stable angular position, automatic drive means for rotating said cam unit step by step in said first direction and means for connecting said cam unit to rotate with said control shaft with an angular clearance which is less than the angle through which the control shaft travels between one of its stable angular positions and the limiting unstable intermediate angular position which follows.

2. A programmer according to claim 1, in which said positioning means comprising a toothed member connected kinematically to said control shaft and a spring-pressed follower engageable with teeth of said toothed member, said stable positions being defined by engagement of said follower in recesses between successive teeth of said toothed member and said limiting unstable positions being defined by engagement of said follower with tops of successive teeth of said toothed member, said angular clearance being less than the angular distance between successive teeth of said toothed member.

3. A programmer according to claim 2, in which said drive means for rotating said cam unit comprises a second toothed member united kinematically with said cam unit and a pawl device for advancing said second toothed member one tooth at a time, said second toothed member having the same number of teeth as the toothed member kinematically connected with said control shaft.

4. A programmer according to claim 2, in which said means for connecting said cam unit with said control shaft comprises a driving segment on said toothed member received with clearance in a housing in said cam unit.

* * * * *